April 22, 1924.

F. P. MURRAY

ROLLER BEARING

Filed July 31, 1923    2 Sheets-Sheet 1

Witnesses:
Virgil L. Mares
George A. Gruss

Inventor
Frank P. Murray

By Joshua R. H. Potts
his Attorney

April 22, 1924.                    1,491,722
F. P. MURRAY
ROLLER BEARING
Filed July 31, 1923      2 Sheets-Sheet 2
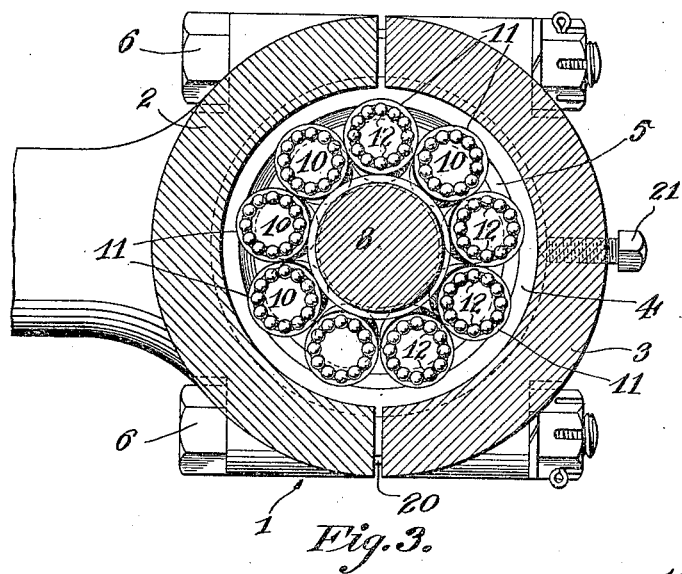
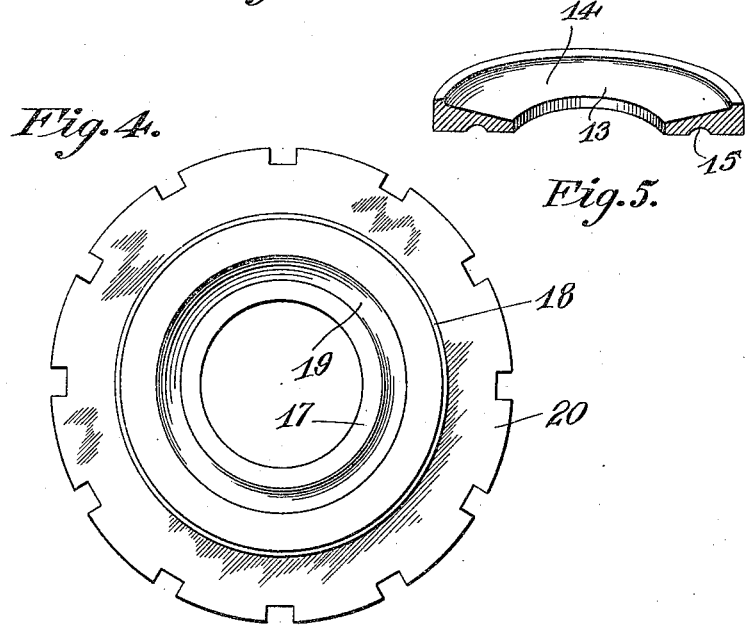
Witnesses:
Virgil L. Mares
George A. Gruss
Inventor
Frank P. Murray
By Joshua R. H. Potts
his Attorney Patented Apr. 22, 1924.

1,491,722

UNITED STATES PATENT OFFICE.

FRANK P. MURRAY, OF PHILADELPHIA, PENNSYLVANIA.

ROLLER BEARING.

Application filed July 31, 1923. Serial No. 654,819.

*To all whom it may concern:*

Be it known that I, FRANK P. MURRAY, a citizen of the United States, residing at Philadelphia, in the county of Philadelphia and State of Pennsylvania, have invented certain new and useful Improvements in Roller Bearings, of which the following is a specification.

My invention relates to roller bearings. The object is to provide a bearing which is practically frictionless, which is adjustable to take up the play caused by wear, which will take up the thrust and which is simple and durable in construction.

This object, and other advantageous ends which will be described hereinafter, I attain in the following manner, reference being had to the accompanying drawings in which—

Figure 1:
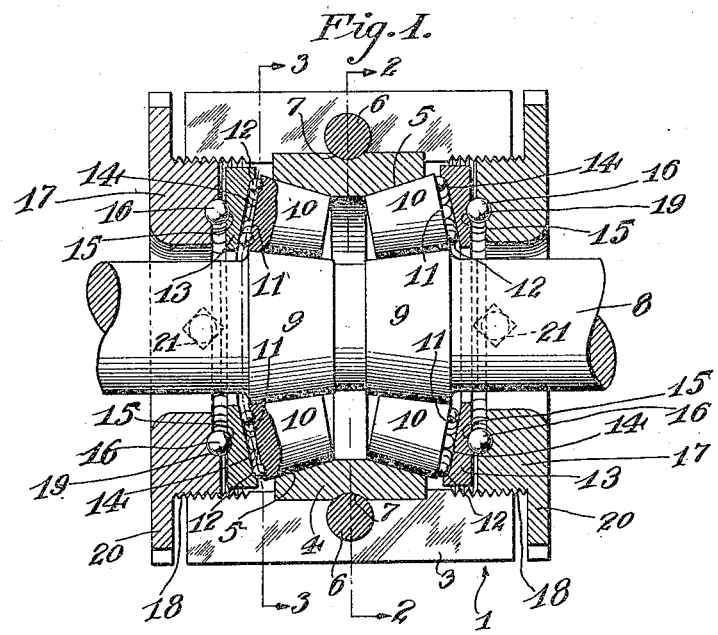
Figure 2:
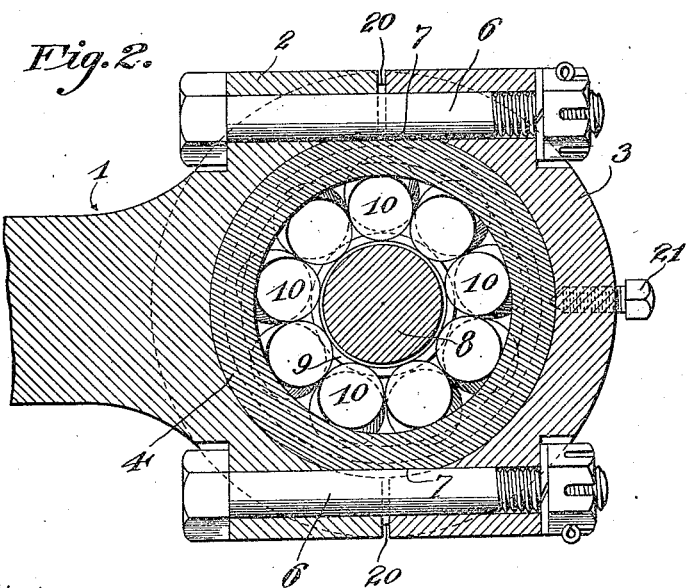

Figure 1 is a central section through a bearing constructed in accordance with my invention, Figure 2 a section on line 2—2 of Figure 1, Figure 3 a section on line 3—3 of Figure 1, Figure 4 an inside face view of an adjusting ring which forms a part of my invention, and Figure 5 a sectional perspective view of a thrust ring which forms a part of my invention.

Referring to the drawings, 1 indicates a bearing casing made in sections 2 and 3. A ring 4, provided with a pair of inclined races 5, is fitted within the casing and locked thereto against rotation by securing bolts 6 passing through the casing and having their central parts passing within grooves 7 in ring 4. A shaft 8, provided with a pair of inclined races 9, is disposed within the casing so that its races 9 are opposite races 5. Two sets of rollers 10, of frusto-conical shape, are disposed between races 5 and 9 so that when the shaft rotates, it will roll on the frusto-conical rollers. The outer end 11 of each roller is provided with a ball race for receiving balls 12. A thrust ring 13 is provided for each set of rollers and has a flat inclined race 14 on one side which engages the balls 12 and a ball race 15 on the other side for receiving balls 16. An adjusting ring 17 is provided for each set of rollers and has a threaded part 18 for taking into the threaded ends of the casing. The adjusting ring is provided with a ball race 19 for engagement with balls 16 and an integral flange 20 notched in its periphery for receiving a spanner wrench or other suitable tool for turning the ring to adjust the conical rollers. The adjusting rings are held in adjusted position by set screws 21 or other suitable means.

When the bearing is in use and has worn to an extent where the play is objectionable it is adjusted by loosening the set screws 21 and turning the adjusting rings 17 so that the rollers will be forced inward until the play is taken up. The set screws are then tightened to hold the rings in adjusted position and the bearing is again ready for use. The frusto-conical shape of the rollers, in connection with the thrust rings, takes up the thrust of the shaft. The balls 12 on the ends of the rollers and the balls 16 between the thrust ring and adjusting ring reduce the friction caused by the thrust to a minimum.

A bearing constructed as above described may be easily and cheaply made. All parts are simple and require simple machining.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A bearing including a casing provided with inclined races; a shaft provided with inclined races; rollers between the races; a thrust ring disposed at the ends of the rollers; an adjusting ring mounted in the casing, and anti-friction means between the thrust ring and the adjusting ring and the ends of the rollers and thrust ring.

2. A bearing including a casing provided with inclined races; a shaft provided with inclined races; rollers between the races; a thrust ring disposed at the ends of the rollers; an adjusting ring mounted in the casing, and balls between the thrust ring and the adjusting ring and the ends of the rollers and the thrust ring.

3. A bearing including a casing provided with inclined races; a shaft provided with inclined races; rollers between the races; a thrust ring having an inclined race on one side and a ball race on the other side, disposed at the ends of the rollers; an adjusting ring mounted in the casing, and balls between the thrust ring and the adjusting ring and the ends of the rollers and the thrust ring.

In testimony whereof I have signed my name to this specification in the presence of two subscribing witnesses.

FRANK P. MURRAY.

Witnesses:
ELIZABETH GARBE,
CHAS. E. POTTS.